United States Patent
Miyamoto et al.

(10) Patent No.: US 12,024,040 B2
(45) Date of Patent: Jul. 2, 2024

(54) VEHICLE CONTROL DEVICE, VEHICLE CONTROL METHOD, NON-TRANSITORY STORAGE MEDIUM, AND VEHICLE

(71) Applicant: TOYOTA JIDOSHA KABUSHIKI KAISHA, Toyota (JP)

(72) Inventors: Yuma Miyamoto, Toyota (JP); Kohki Ohkoshi, Nagoya (JP); Masahiro Takahashi, Toyota (JP); Akinori Kawamura, Okazaki (JP); Taisuke Hayashi, Miyoshi (JP); Takashi Fukai, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 354 days.

(21) Appl. No.: 17/515,931

(22) Filed: Nov. 1, 2021

(65) Prior Publication Data

US 2022/0153159 A1 May 19, 2022

(30) Foreign Application Priority Data

Nov. 17, 2020 (JP) .................... 2020-190905

(51) Int. Cl.
*B60L 53/51* (2019.01)
*B60L 1/00* (2006.01)

(52) U.S. Cl.
CPC ............... *B60L 53/51* (2019.02); *B60L 1/00* (2013.01)

(58) Field of Classification Search
CPC ... B60K 2016/003; B60L 53/31; B60L 8/003; B60L 1/00
See application file for complete search history.

(56) References Cited

U.S. PATENT DOCUMENTS

| 8,301,365 | B2 * | 10/2012 | Niwa | ................. G01C 21/3682 701/439 |
| 8,798,830 | B2 * | 8/2014 | Sobue | ................. B60L 15/2045 701/22 |
| 10,351,011 | B2 * | 7/2019 | Kubo | ..................... B60L 58/20 |

(Continued)

FOREIGN PATENT DOCUMENTS

| JP | 2015-89205 A | 5/2015 |
| JP | 2017-112765 A | 6/2017 |

(Continued)

*Primary Examiner* — Jeffrey J Restifo
(74) *Attorney, Agent, or Firm* — Oblon, McClelland, Maier & Neustadt, L.L.P.

(57) ABSTRACT

A vehicle includes a solar panel and a vehicle control device. The vehicle control device is configured to control supply of electric power generated by the solar panel, configured to count the number of power supply operations in which the electric power is supplied from the solar panel to a target device that is a power supply destination, configured to determine whether the number of power supply operations satisfies a first condition, to configured execute power supply from the solar panel to the target device when determination is made that the number of power supply operations satisfies the first condition. The vehicle control device is configured not to execute the power supply from the solar panel to the target device when determination is made that the number of power supply operations does not satisfy the first condition.

9 Claims, 6 Drawing Sheets

(56) References Cited

U.S. PATENT DOCUMENTS

| | | | |
|---|---|---|---|
| 11,594,907 B2* | 2/2023 | Bae | B60K 16/00 |
| 11,639,113 B2* | 5/2023 | Gaither | B60L 8/003 |
| | | | 701/22 |
| 11,909,249 B2* | 2/2024 | Koba | B60K 16/00 |
| 11,926,233 B2* | 3/2024 | Miyamoto | B60L 1/00 |
| 2021/0155109 A1 | 5/2021 | Miyamoto et al. | |
| 2022/0153159 A1* | 5/2022 | Miyamoto | B60L 53/51 |
| 2023/0158913 A1* | 5/2023 | Murakami | B60L 53/60 |
| | | | 320/101 |

FOREIGN PATENT DOCUMENTS

| | | |
|---|---|---|
| JP | 2018-113773 A | 7/2018 |
| JP | 2019-126219 A | 7/2019 |
| JP | 2021-83248 A | 5/2021 |

\* cited by examiner

VEHICLE CONTROL DEVICE, VEHICLE CONTROL METHOD, NON-TRANSITORY STORAGE MEDIUM, AND VEHICLE

CROSS-REFERENCE TO RELATED APPLICATION

This application claims priority to Japanese Patent Application No. 2020-190905 filed on Nov. 17, 2020, incorporated herein by reference in its entirety.

BACKGROUND

1. Technical Field

The present disclosure relates to a vehicle control device configured to control supply of electric power generated by a solar panel mounted on a vehicle, and also relates to a vehicle control method, a non-transitory storage medium, and a vehicle.

2. Description of Related Art

Japanese Unexamined Patent Application Publication No. 2018-113773 (JP 2018-113773 A) discloses a photovoltaic power generating system configured to supply electric power generated by a solar panel to a power supply destination device. In the photovoltaic power generating system, the temperature of a battery of the power supply destination is estimated based on an estimated value of a change in solar radiation intensity over time. When the estimated maximum temperature of the battery is lower than a safety temperature, the battery is charged or discharged in a high state of charge (SOC) range. When the estimated maximum temperature of the battery is equal to or higher than the safety temperature, the battery is charged or discharged in a low SOC range.

SUMMARY

In a sequential power supply operation from start to stop of power supply from a solar panel to a power supply destination, loads are imposed on devices such as a control device and a relay related to the power supply operation. For example, when a solar radiation amount is small and electric power generated by the solar panel fluctuates across a power threshold for determining whether charging is possible, the start of power supply and the stop of power supply are repeated frequently to increase the number of power supply operations. Therefore, there is a possibility that the devices deteriorate earlier.

The present disclosure provides a vehicle control device, a vehicle control method, a non-transitory storage medium, and a vehicle that can suppress early deterioration of devices such as a control device and a relay related to a power supply operation.

A first aspect of a technology of the present disclosure relates to a vehicle control device configured to control supply of electric power generated by a solar panel mounted on a vehicle. The vehicle control device includes a counting unit, a determination unit, and a power supply controller. The counting unit is configured to count the number of power supply operations in which the electric power is supplied from the solar panel to a target device that is a power supply destination. The determination unit is configured to determine whether the number of power supply operations counted by the counting unit satisfies a first condition. The power supply controller is configured to execute power supply from the solar panel to the target device when the determination unit determines that the number of power supply operations satisfies the first condition. The power supply controller is configured not to execute the power supply from the solar panel to the target device when the determination unit determines that the number of power supply operations does not satisfy the first condition.

In the first aspect, the determination unit may be configured to determine whether the power supply from the solar panel to the target device is possible. The power supply controller may be configured to execute the power supply from the solar panel to the target device when the determination unit determines that the number of power supply operations satisfies the first condition and the power supply from the solar panel to the target device is possible.

In the first aspect, the power supply controller may be configured to stop the power supply from the solar panel to the target device when the determination unit determines that the power supply from the solar panel to the target device is not possible after a start of the power supply.

In the first aspect, the vehicle control device may include a measuring unit configured to measure time. The determination unit may be configured to determine, as the first condition, whether the number of power supply operations counted by the counting unit within a first period from a current time to a past time is smaller than a first threshold.

In the first aspect, the vehicle control device may include an acquiring unit configured to acquire date-and-time information. The counting unit may be configured to reset the counted number when a time indicated by the date-and-time information acquired by the acquiring unit is a first time. The determination unit may be configured to determine, as the first condition, whether the number of power supply operations counted by the counting unit is smaller than a second threshold.

In the first aspect, the first time may be the same time on individual days.

A second aspect of the technology of the present disclosure relates to a vehicle control device configured to control supply of electric power generated by a solar panel mounted on a vehicle. The vehicle control device includes an acquiring unit, a counting unit, a determination unit, and a power supply controller. The acquiring unit is configured to acquire a voltage at an output terminal of the solar panel. The counting unit is configured to count the number of voltage increases that are changes in the voltage acquired by the acquiring unit from a voltage lower than a third threshold to a voltage equal to or higher than the third threshold. The determination unit is configured to determine whether the number of voltage increases counted by the counting unit satisfies a second condition. The power supply controller is configured to execute power supply from the solar panel to a target device that is a power supply destination when the determination unit determines that the number of voltage increases satisfies the second condition. The power supply controller is configured not to execute the power supply from the solar panel to the target device when the determination unit determines that the number of voltage increases does not satisfy the second condition.

A third aspect of the technology of the present disclosure relates to a vehicle. The vehicle includes a solar panel and a vehicle control device. The vehicle control device is configured to control supply of electric power generated by the solar panel. The vehicle control device is configured to count the number of power supply operations in which the electric power is supplied from the solar panel to a target device that is a power supply destination. The vehicle control device is configured to determine whether the number of power supply operations satisfies a first condition. The vehicle control device is configured_to execute power supply from the solar panel to the target device when determination is made that the number of power supply operations satisfies the first condition. The vehicle control device is configured not to execute the power supply from the solar panel to the target device when determination is made that the number of power supply operations does not satisfy the first condition.

A fourth aspect of the technology of the present disclosure relates to a vehicle control method to be executed by a computer of a vehicle control device configured to control supply of electric power generated by a solar panel mounted on a vehicle. The vehicle control method includes a step of counting the number of power supply operations in which the electric power is supplied from the solar panel to a target device that is a power supply destination, a step of determining whether the number of power supply operations counted in the counting step satisfies a first condition, a step of executing power supply from the solar panel to the target device when, in the determining step, determination is made that the number of power supply operations satisfies the first condition, and a step of not executing the power supply from the solar panel to the target device when, in the determining step, determination is made that the number of power supply operations does not satisfy the first condition.

A fifth aspect of the technology of the present disclosure relates to a non-transitory storage medium storing instructions that are executable by one or more processors of a computer of a vehicle control device configured to control supply of electric power generated by a solar panel mounted on a vehicle and that cause the one or more processors to perform the following steps. The steps include a step of counting the number of power supply operations in which the electric power is supplied from the solar panel to a target device that is a power supply destination, a step of determining whether the number of power supply operations counted in the counting step satisfies a first condition, a step of executing power supply from the solar panel to the target device when, in the determining step, determination is made that the number of power supply operations satisfies the first condition, and a step of not executing the power supply from the solar panel to the target device when, in the determining step, determination is made that the number of power supply operations does not satisfy the first condition.

According to the first aspect, the second aspect, the third aspect, the fourth aspect, and the fifth aspect of the present disclosure, it is possible to limit the number of power supply operations from the solar panel to the power supply destination, thereby suppressing early deterioration of the devices such as the control device and the relay related to the power supply operation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

While the number of power supply operations from a solar panel to a target device does not exceed a specified value, a vehicle control device of the present disclosure permits subsequent execution of power supply from the solar panel to the target device. When the number of power supply operations exceeds the specified value, the vehicle control device does not permit execution of the power supply from the solar panel to the target device. Thus, it is possible to limit the number of power supply operations from the solar panel to the power supply destination, thereby suppressing early deterioration of devices such as a control device and a relay related to the power supply operation. An embodiment of the present disclosure is described below in detail with reference to the drawings.

Embodiment

Configuration

Figure 1:
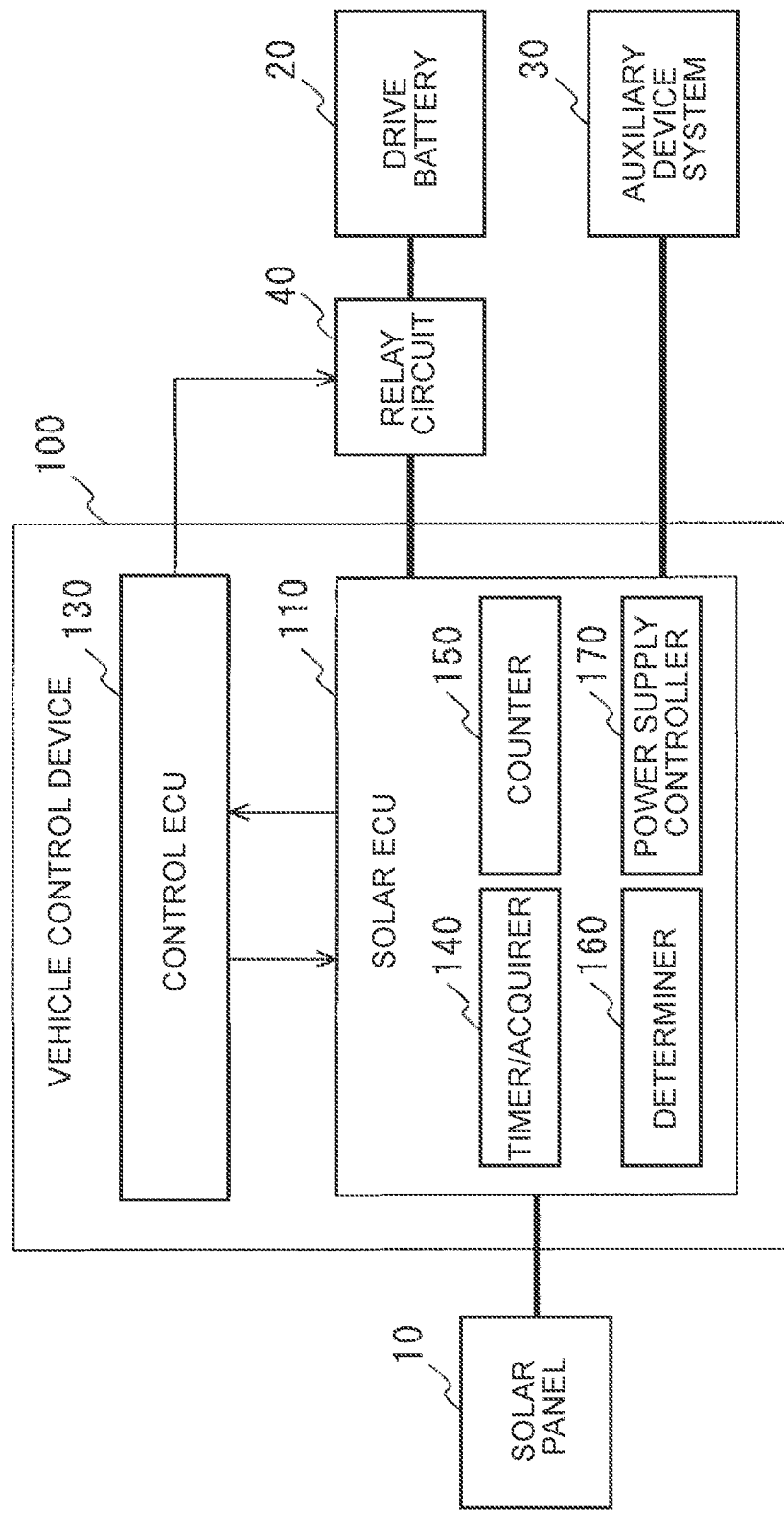
FIG. 1 is a functional block diagram of a vehicle control device and its periphery according to one embodiment.

FIG. 1 is a functional block diagram of a vehicle control device 100 and its periphery according to one embodiment of the present disclosure. Functional blocks exemplified in FIG. 1 include a solar panel 10, a drive battery 20, an auxiliary device system 30, a relay circuit 40, and the vehicle control device 100. In FIG. 1, wiring for transmitting electric power is represented by wide continuous lines, and wiring for transmitting, for example, control signals instead of electric power is represented by narrow arrow lines.

The solar panel 10 is a photovoltaic cell module that is an aggregate of photovoltaic cells that generate electric power by receiving sunlight radiation. The amount of electric power generated by the solar panel 10 depends on solar radiation intensity. The electric power generated by the solar panel 10 is output to a solar electronic control unit (ECU) 110 of the vehicle control device 100. For example, the solar panel 10 can be mounted on a roof of a vehicle.

The drive battery 20 is a chargeable and dischargeable secondary battery such as a lithium ion battery. Examples of the drive battery 20 include a battery for supplying electric power to a so-called main device (not illustrated) related to vehicle traveling, such as an electric motor for traveling. The drive battery 20 can store electric power generated by the solar panel 10 and supplied via the vehicle control device 100 and the relay circuit 40.

The auxiliary device system 30 includes so-called auxiliary devices (not illustrated) other than the main device and an auxiliary device battery (not illustrated) for supplying electric power to the auxiliary devices. For example, the auxiliary device is an air conditioner, a lighting device, or other on-board devices. The auxiliary device battery is a chargeable and dischargeable secondary battery such as a lead acid battery or a lithium ion battery, and can store electric power generated by the solar panel 10 and supplied via the vehicle control device 100.

The relay circuit 40 is provided between the solar ECU 110 and the drive battery 20, and can switch a connected state and a disconnected state under control of a control ECU 130.

The vehicle control device 100 controls power supply from the solar panel 10 to the drive battery 20 and the auxiliary device system 30. The vehicle control device 100 includes the solar ECU 110 and the control ECU 130. The solar ECU 110 includes a measuring unit/acquiring unit 140, a counting unit 150, a determination unit 160, and a power supply controller 170.

The solar ECU 110 is electrically connected to the solar panel 10, to the drive battery 20 via the relay circuit 40, and to the auxiliary device system 30. The solar ECU 110 can control and manage a power generation condition of the solar panel 10, and supply electric power generated by the solar panel 10 to a target device that is a power supply destination based on an instruction from the control ECU 130. In this embodiment, the drive battery 20 and the auxiliary device system 30 are target devices. The solar ECU 110 can acquire a voltage at an output terminal of the solar panel 10 (hereinafter referred to as "output terminal voltage"), and outputs the acquired output terminal voltage to the control ECU 130.

The control ECU 130 controls the solar ECU 110 and the relay circuit 40 based on information acquired from the solar ECU 110 and, for example, conditions of the vehicle acquired from on-board devices (not illustrated) as necessary.

The measuring unit/acquiring unit 140 can measure a period (hour, minute, or second). The measuring unit/acquiring unit 140 can acquire date-and-time information including a date and/or time. For example, a clock function of the vehicle and a function of receiving global positioning system (GPS) information may be used for the measuring unit/acquiring unit 140. The period measured by the measuring unit/acquiring unit 140 and the date-and-time information acquired by the measuring unit/acquiring unit 140 are output to the counting unit 150 and the determination unit 160. The measuring unit/acquiring unit 140 can acquire the output terminal voltage of the solar panel 10.

The counting unit 150 counts the number of operations of supplying electric power from the solar panel 10 to either one or both of the drive battery 20 and the auxiliary device system 30 (target device). The counting may be executed at a timing when the power supply from the solar panel 10 to the target device is started via the solar ECU 110 or when the power supply from the solar panel 10 to the target device is terminated. That is, the counting unit 150 only needs to count the number of sequential power supply operations from start to stop of the power supply from the solar panel 10 to the target device. For example, information indicating that the electric power is supplied from the solar panel 10 to the target device is stored in a predetermined storage (not illustrated) in association with the period measured by the measuring unit/acquiring unit 140.

The counting unit 150 can reset the counted number based on a result of determination made by the determination unit 160 described later about the date-and-time information acquired by the measuring unit/acquiring unit 140. The counting unit 150 can count the number of times the output terminal voltage of the solar panel 10 acquired by the measuring unit/acquiring unit 140 exceeds a predetermined voltage.

The determination unit 160 makes predetermined determination about the number counted by the counting unit 150. More specifically, the determination unit 160 determines whether the number of power supply operations counted by the counting unit 150 satisfies a preset first condition. The number of power supply operations and the first condition are described later. Alternatively, the determination unit 160 determines whether the number of voltage increases counted by the counting unit 150 satisfies a preset second condition. The number of voltage increases and the second condition are described later.

The determination unit 160 determines whether the power supply from the solar panel 10 to the target device is possible. Whether the power supply is possible can be determined as appropriate based on electric power generated by the solar panel 10, conditions of the devices such as the control device and the relay related to the power supply operation, and vehicle conditions such as a power storage status of the drive battery 20. The determination unit 160 can make determination about the date-and-time information acquired by the measuring unit/acquiring unit 140, and instruct the counting unit 150 to reset the counted number.

The power supply controller 170 determines whether to execute the power supply from the solar panel 10 to the target device based on a result of determination made by the determination unit 160, and controls the power supply in accordance with the determination. The power supply control of the power supply controller 170 based on the determination result is described later.

Each electronic control unit (ECU) of the vehicle control device 100 typically includes a processor, a memory, and an input/output interface. The processor reads and executes programs stored in the memory to implement the functions described above. The control ECU 130 may partially or entirely include configurations of a verification ECU configured to control verification between an electronic key and the vehicle, a hybrid vehicle (HV) ECU configured to control hybrid traveling of the vehicle, a central charging ECU configured to control charging of a plurality of batteries, and a battery ECU configured to monitor statuses of the batteries.

Control

Next, several examples of the power supply control to be executed by the vehicle control device 100 according to the embodiment of the present disclosure are described with reference to FIG. 2 to FIG. 6 as well.

(1) FIRST EXAMPLE

Figure 2:
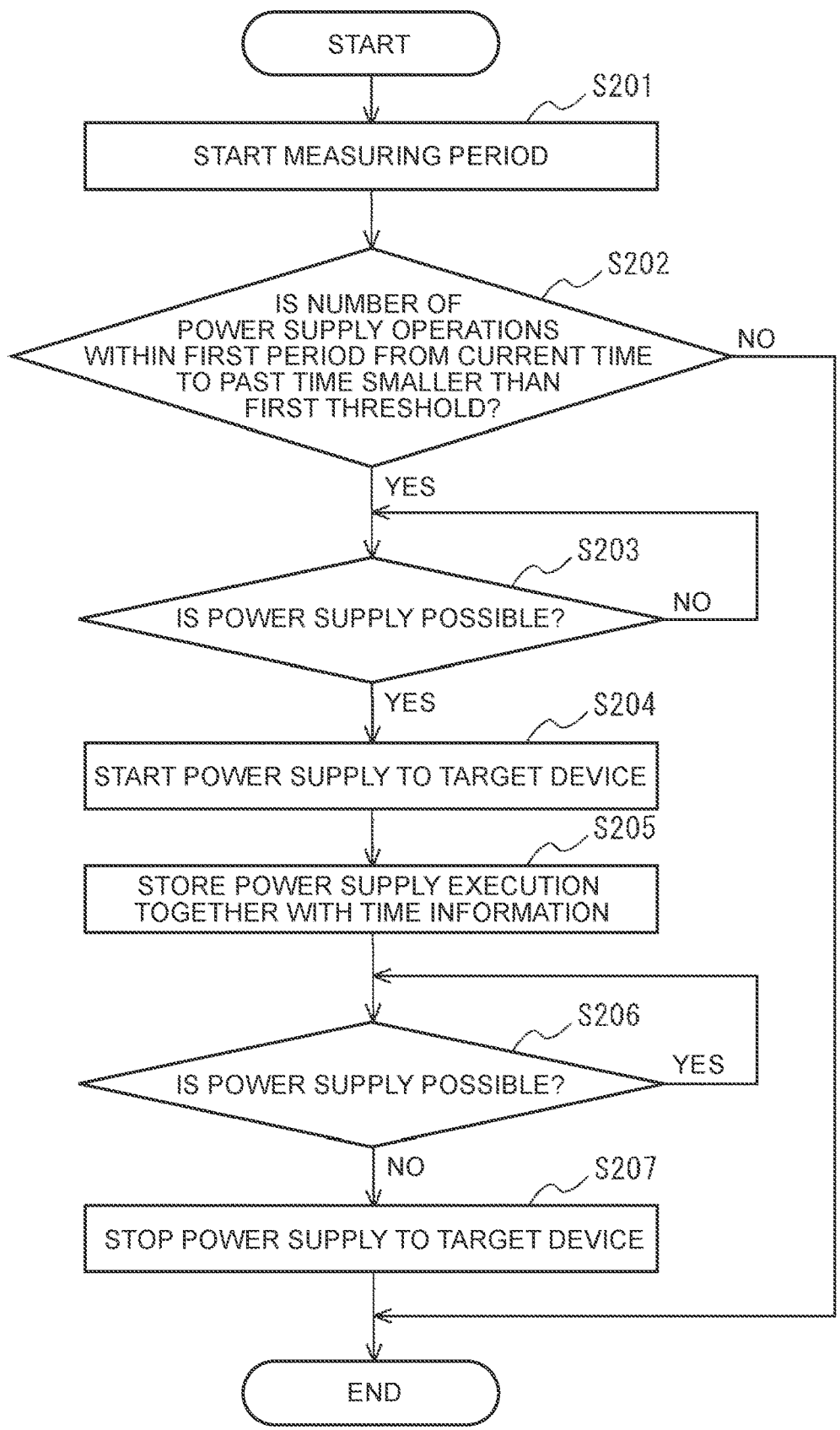
FIG. 2 is a flowchart for describing a processing procedure of a first example of power supply control.

FIG. 2 is a flowchart for describing a processing procedure of a first example of the power supply control to be executed by the solar ECU 110 of the vehicle control device 100.

A power supply control process in the first example illustrated in FIG. 2 is started when the solar ECU 110 is activated and a photovoltaic power generating system including the solar panel 10, the drive battery 20, the auxiliary device system 30, the relay circuit 40, and the vehicle control device 100 is operated, and is repeated until the photovoltaic power generating system is stopped.

Step S201

The measuring unit/acquiring unit 140 starts measuring a period (time measurement). When the measurement of the period is started, the process proceeds to Step S202.

Step S202

The determination unit 160 determines whether the number of power supply operations counted by the counting unit 150 satisfies the first condition. The number of power supply operations n1 in the first example is counted by the counting unit 150 within a first period Ta from a current time Tcur to a past time Tpast (Ta=Tcur−Tpast). The counted number is the number of pieces of information indicating that electric power is supplied from the solar panel 10 to the target device (either one or both of the drive battery 20 and the auxiliary device system 30). The first condition in the first example is that the number of power supply operations n1 is smaller than a first threshold N1 (n1<N1). The first period Ta and the first threshold N1 are predetermined values determined in consideration of, for example, balance between a decrease in the performance of the photovoltaic power generating system and a reduction in the number of power supply operations. For example, the first period Ta and the first threshold N1 are appropriately set based on properties of the solar panel 10, durability of the devices such as the control device and the relay related to the power supply operation, and a loss of the performance of the photovoltaic power generating system. When determination is made that the number of power supply operations n1 satisfies the first condition because the number of power supply operations n1 is smaller than the first threshold N1 (S202: YES), the process proceeds to Step S203. When determination is made that the number of power supply operations n1 does not satisfy the first condition because the number of power supply operations n1 is equal to or larger than the first threshold N1 (S202: NO), the power supply control process is terminated.

Step S203

The determination unit 160 determines whether the power supply from the solar panel 10 to the target device (either one or both of the drive battery 20 and the auxiliary device system 30) is possible. The determination of whether the power supply is possible is described above. When determination is made that the power supply from the solar panel 10 to the target device is possible (S203: YES), the process proceeds to Step S204. When determination is made that the power supply from the solar panel 10 to the target device is not possible (S203: NO), the determination is repeated until the power supply becomes possible.

Step S204

The power supply controller 170 executes the power supply from the solar panel 10 to the target device under control of the control ECU 130. When the power supply to the target device is executed, the process proceeds to Step S205.

Step S205

The counting unit 150 stores information indicating that electric power is supplied from the solar panel 10 to the target device in, for example, the predetermined storage together with a start time of the power supply measured by the measuring unit/acquiring unit 140. When the pieces of information related to the power supply execution and the time are stored, the process proceeds to Step S206.

Step S206

The determination unit 160 determines whether the power supply from the solar panel 10 to the target device (either one or both of the drive battery 20 and the auxiliary device system 30) remains possible. The determination of whether the power supply is possible is described above. When determination is made that the power supply from the solar panel 10 to the target device remains possible (S206: YES), the power supply from the solar panel 10 to the target device is continued. When determination is made that the power supply from the solar panel 10 to the target device does not remain possible (S206: NO), the process proceeds to Step S207.

Step S207

The power supply controller 170 stops the power supply from the solar panel 10 to the target device under control of the control ECU 130. When the power supply to the target device is stopped, the power supply control process is terminated.

In the first example of the power supply control described above, when the number of power supply operations n1 from the solar panel 10 to the target device within the predetermined period (the first period Ta from the current time Tcur to the past time Tpast) exceeds the reference (equal to or larger than the first threshold N1), the power supply from the solar panel 10 to the target device is not executed even in a case where the solar panel 10 is currently generating sufficient electric power. This control can limit the number of power supply operations from the solar panel 10 to the power supply destination. Thus, it is possible to suppress early deterioration of the devices such as the control device and the relay related to the power supply operation.

(2) SECOND EXAMPLE

Figure 3:
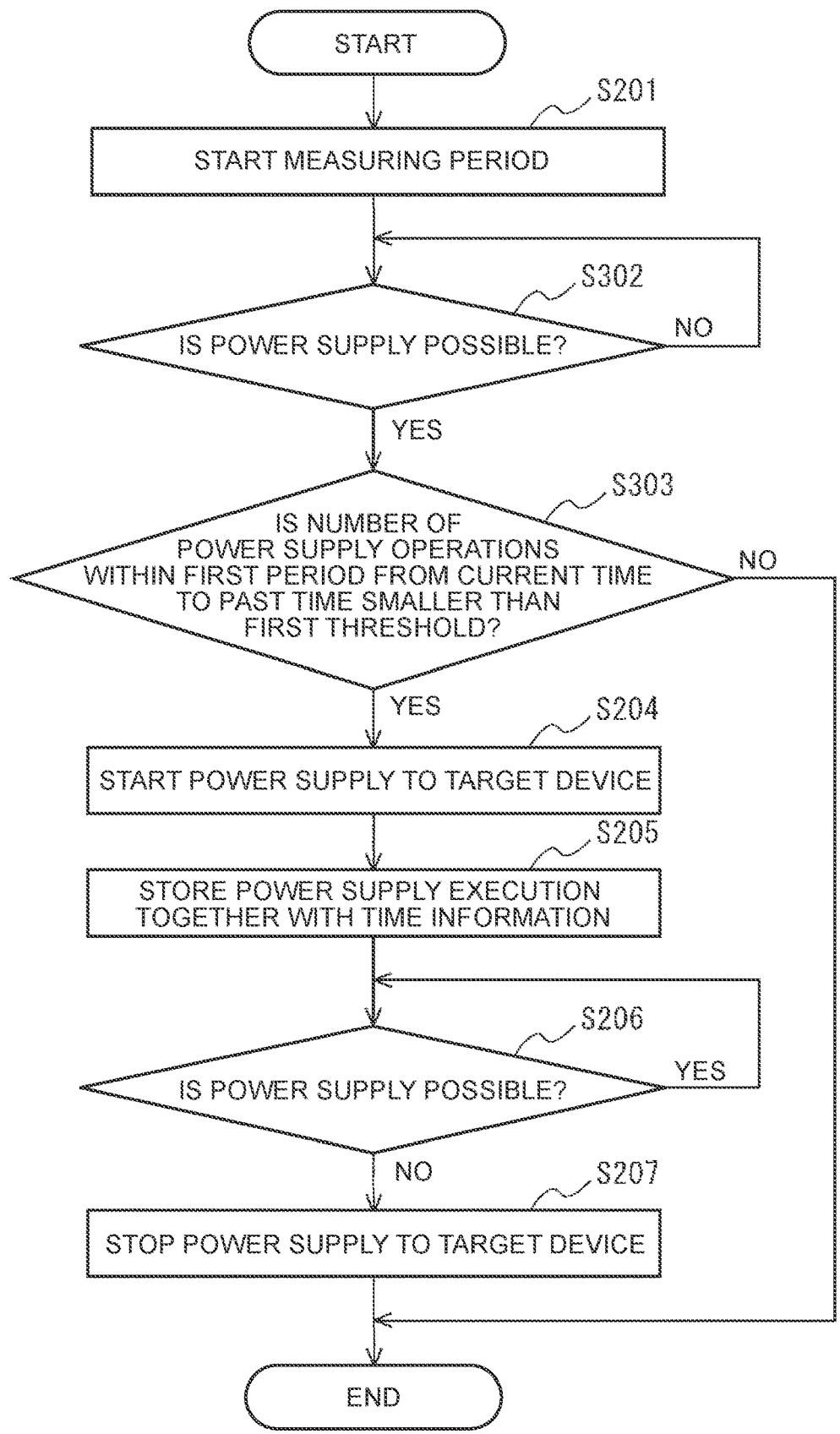
FIG. 3 is a flowchart for describing a processing procedure of a second example of the power supply control.

FIG. 3 is a flowchart for describing a processing procedure of a second example of the power supply control to be executed by the solar ECU 110 of the vehicle control device 100. In the power supply control in the second example, the order of the processes of Step S202 and Step S203 of the power supply control in the first example (FIG. 2) is changed. Specifically, processes of Step S302 and Step S303 are executed between Step S201 and Step S204. Processes other than those of Step S302 and Step S303 in the second example are similar to the processes in the first example, and are therefore described while a part of the processes is omitted.

Step S201

The measuring unit/acquiring unit 140 starts measuring a period (time measurement). When the measurement of the period is started, the process proceeds to Step S302.

Step S302

The determination unit 160 determines whether the power supply from the solar panel 10 to the target device (either one or both of the drive battery 20 and the auxiliary device system 30) is possible. The determination of whether the power supply is possible is described above. When determination is made that the power supply from the solar panel 10 to the target device is possible (S302: YES), the process proceeds to Step S303. When determination is made that the power supply from the solar panel 10 to the target device is not possible (S302: NO), the determination is repeated until the power supply becomes possible.

Step S303

The determination unit 160 determines whether the number of power supply operations counted by the counting unit 150 satisfies the first condition. In the second example, the number of power supply operations n1, the first period Ta, and the first threshold N1 are similar to those in the first example. When determination is made that the number of power supply operations n1 satisfies the first condition because the number of power supply operations n1 is smaller than the first threshold N1 (S303: YES), the process proceeds to Step S204. When determination is made that the number of power supply operations n1 does not satisfy the first condition because the number of power supply operations n1 is equal to or larger than the first threshold N1 (S303: NO), the power supply control process is terminated.

In the second example of the power supply control described above, when the number of power supply operations n1 from the solar panel 10 to the target device within the predetermined period exceeds the reference, the power supply from the solar panel 10 to the target device is not executed similarly to the first example even in a case where the solar panel 10 is currently generating sufficient electric power. This control can limit the number of power supply operations from the solar panel 10 to the power supply destination. Thus, it is possible to suppress early deterioration of the devices such as the control device and the relay related to the power supply operation.

(3) THIRD EXAMPLE

Figure 4:
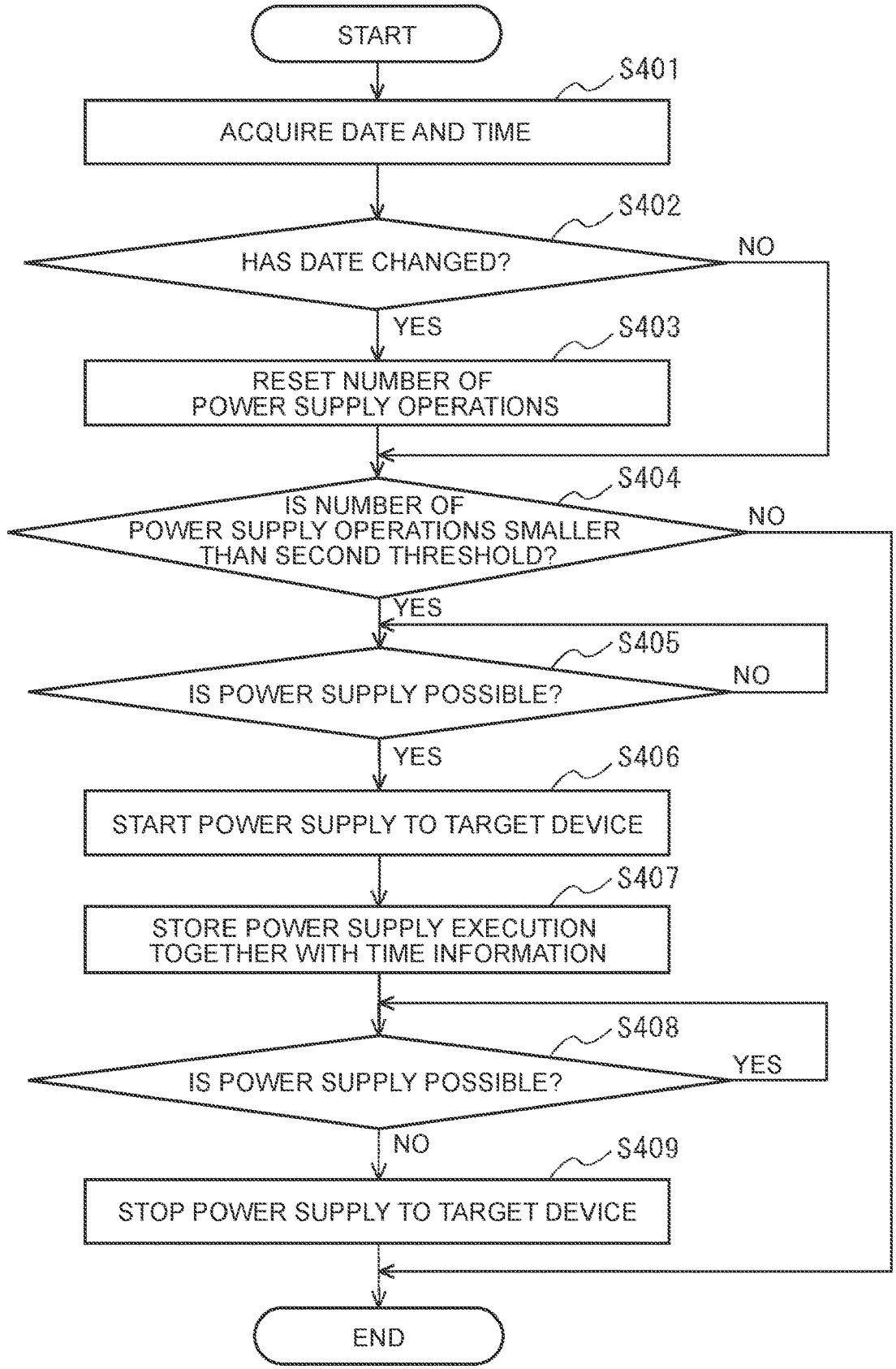
FIG. 4 is a flowchart for describing a processing procedure of a third example of the power supply control.

FIG. 4 is a flowchart for describing a processing procedure of a third example of the power supply control to be executed by the solar ECU 110 of the vehicle control device 100.

A power supply control process in the third example illustrated in FIG. 4 is started when the solar ECU 110 is activated and the photovoltaic power generating system including the solar panel 10, the drive battery 20, the auxiliary device system 30, the relay circuit 40, and the vehicle control device 100 is operated, and is repeated until the photovoltaic power generating system is stopped.

Step S401

The measuring unit/acquiring unit 140 acquires date-and-time information (date and/or time). When the date-and-time information is acquired, the process proceeds to Step S402.

Step S402

The determination unit 160 determines whether the date has changed by referring to the date-and-time information acquired by the measuring unit/acquiring unit 140. Whether the date has changed may be determined based on whether the date indicated by the current date-and-time information acquired by the measuring unit/acquiring unit 140 in the current process differs from a date indicated by previous date-and-time information acquired by the measuring unit/acquiring unit 140 in the previous process, or whether the time indicated by the current date-and-time information is 24 hours after the time indicated by the previous date-and-time information (the same time on individual days). When determination is made that the date has changed (S402: YES), the process proceeds to Step S403. When determination is made that the date has not changed (S402: NO), the process proceeds to Step S404.

Step S403

The counting unit 150 resets the counted number based on information indicating that electric power is supplied from the solar panel 10 to the target device. When the counted number is reset, the process proceeds to Step S404.

Step S404

The determination unit 160 determines whether the number of power supply operations counted by the counting unit 150 satisfies the first condition. The number of power supply operations n2 in the third example is counted by the counting unit 150 within a period from the start of the power supply control process or from the reset of the counted number in Step S403 to the current time (number of pieces of information indicating that electric power is supplied). The first condition in the third example is that the number of power supply operations n2 is smaller than a second threshold N2 (n2<N2). The second threshold N2 is a predetermined value determined based on the number of power supply operations permissible per day (upper limit number). For example, the second threshold N2 is appropriately set based on the properties of the solar panel 10, the durability of the devices such as the control device and the relay related to the power supply operation, and the loss of the performance of the photovoltaic power generating system. When determination is made that the number of power supply operations n2 satisfies the first condition because the number of power supply operations n2 is smaller than the second threshold N2 (S404: YES), the process proceeds to Step S405. When determination is made that the number of power supply operations n2 does not satisfy the first condition because the number of power supply operations n2 is equal to or larger than the second threshold N2 (S404: NO), the power supply control process is terminated.

Step S405

The determination unit 160 determines whether the power supply from the solar panel 10 to the target device (either one or both of the drive battery 20 and the auxiliary device system 30) is possible. The determination of whether the power supply is possible is described above. When determination is made that the power supply from the solar panel 10 to the target device is possible (S405: YES), the process proceeds to Step S406. When determination is made that the power supply from the solar panel 10 to the target device is not possible (S405: NO), the determination is repeated until the power supply becomes possible.

Step S406

The power supply controller 170 executes the power supply from the solar panel 10 to the target device under control of the control ECU 130. When the power supply to the target device is executed, the process proceeds to Step S407.

Step S407

The counting unit 150 stores information indicating that electric power is supplied from the solar panel 10 to the target device in, for example, the predetermined storage together with a start time of the power supply measured by the measuring unit/acquiring unit 140. When the pieces of information related to the power supply execution and the time are stored, the process proceeds to Step S408.

Step S408

The determination unit 160 determines whether the power supply from the solar panel 10 to the target device (either one or both of the drive battery 20 and the auxiliary device system 30) remains possible. The determination of whether the power supply is possible is described above. When determination is made that the power supply from the solar panel 10 to the target device remains possible (S408: YES), the power supply from the solar panel 10 to the target device is continued. When determination is made that the power supply from the solar panel 10 to the target device does not remain possible (S408: NO), the process proceeds to Step S409.

Step S409

The power supply controller 170 stops the power supply from the solar panel 10 to the target device under control of the control ECU 130. When the power supply to the target device is stopped, the power supply control process is terminated.

In the third example of the power supply control described above, the number of power supply operations n2 is reset on the daily basis. Therefore, even in a case where the number of power supply operations n2 from the solar panel 10 to the target device on a certain day is limited by exceeding the reference (equal to or larger than the second threshold N2), electric power can be supplied from the solar panel 10 to the target device on the next day. This control can suppress long-term continuation of the limitation that is the stop of the power supply. Thus, it is possible to suppress a significant decrease in the power supply performance of the photovoltaic power generating system.

(4) FOURTH EXAMPLE

Figure 5:
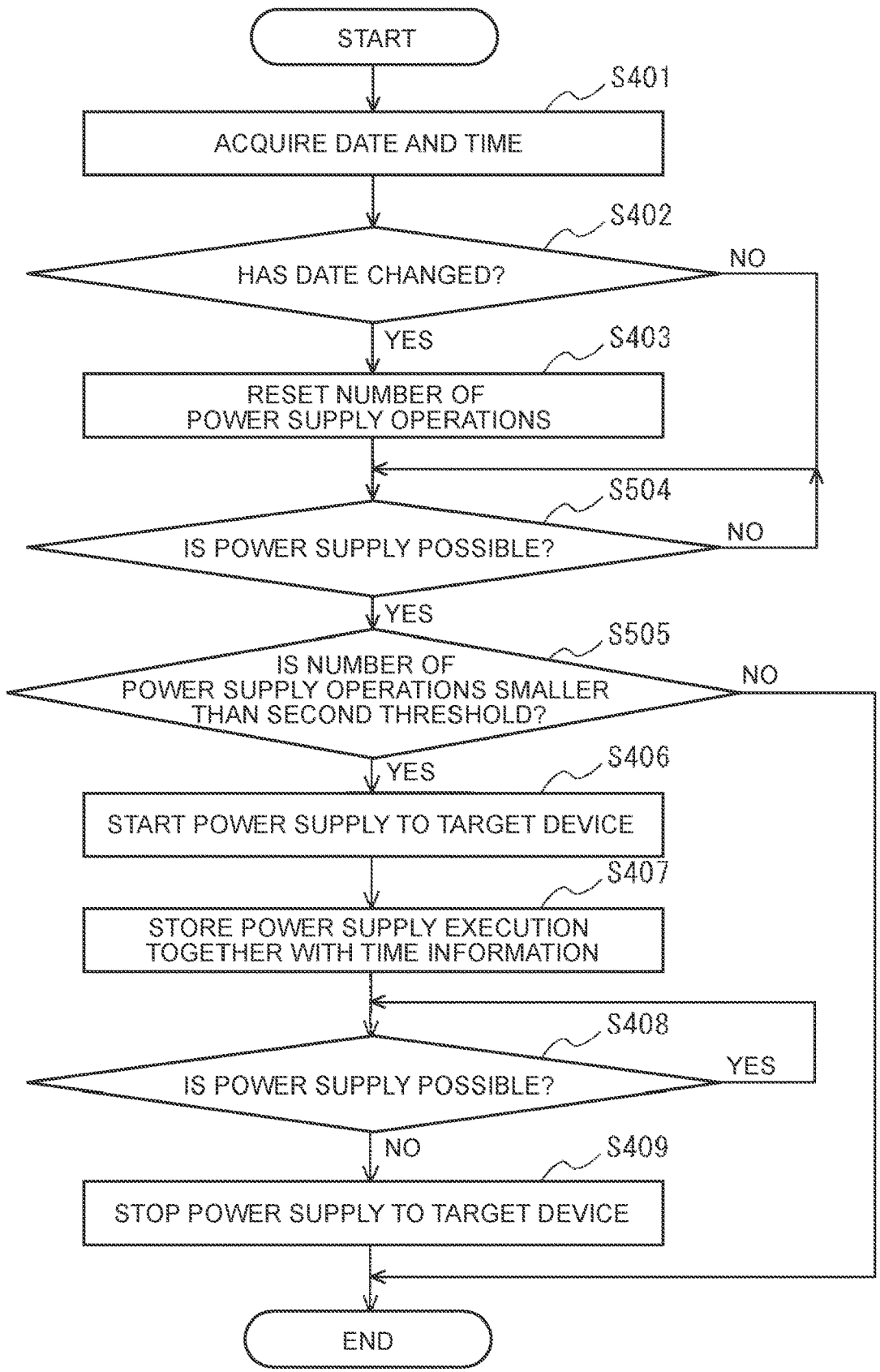
FIG. 5 is a flowchart for describing a processing procedure of a fourth example of the power supply control.

FIG. 5 is a flowchart for describing a processing procedure of a fourth example of the power supply control to be executed by the solar ECU 110 of the vehicle control device 100. In the power supply control in the fourth example, the order of the processes of Step S404 and Step S405 of the power supply control in the third example (FIG. 4) is changed. Specifically, processes of Step S504 and Step S505 are executed between Step S403 and Step S406. Processes other than those of Step S504 and Step S505 in the fourth example are similar to the processes in the third example, and are therefore described while a part of the processes is omitted.

Step S402

The determination unit 160 determines whether the date has changed by referring to the date-and-time information acquired by the measuring unit/acquiring unit 140. When determination is made that the date has changed (S402: YES), the process proceeds to Step S403. When determination is made that the date has not changed (S402: NO), the process proceeds to Step S504.

Step S403

The counting unit 150 resets the counted number based on information indicating that electric power is supplied from the solar panel 10 to the target device. When the counted number is reset, the process proceeds to Step S504.

Step S504

The determination unit 160 determines whether the power supply from the solar panel 10 to the target device (either one or both of the drive battery 20 and the auxiliary device system 30) is possible. The determination of whether the power supply is possible is described above. When determination is made that the power supply from the solar panel 10 to the target device is possible (S504: YES), the process proceeds to Step S505. When determination is made that the power supply from the solar panel 10 to the target device is not possible (S504: NO), the determination is repeated until the power supply becomes possible.

Step S505

The determination unit 160 determines whether the number of power supply operations counted by the counting unit 150 satisfies the first condition. In the fourth example, the number of power supply operations n2 and the second threshold N2 are similar to those in the third example. When determination is made that the number of power supply operations n2 satisfies the first condition because the number of power supply operations n2 is smaller than the second threshold N2 (S505: YES), the process proceeds to Step S406. When determination is made that the number of power supply operations n2 does not satisfy the first condition because the number of power supply operations n2 is equal to or larger than the second threshold N2 (S505: NO), the power supply control process is terminated.

In the fourth example of the power supply control described above, the number of power supply operations n2 is reset on the daily basis similarly to the third example. Therefore, even in a case where the number of power supply operations n2 from the solar panel 10 to the target device on a certain day is limited by exceeding the reference, electric power can be supplied from the solar panel 10 to the target device on the next day. This control can suppress long-term continuation of the limitation that is the stop of the power supply. Thus, it is possible to suppress a significant decrease in the power supply performance of the photovoltaic power generating system.

(5) FIFTH EXAMPLE

Figure 6:
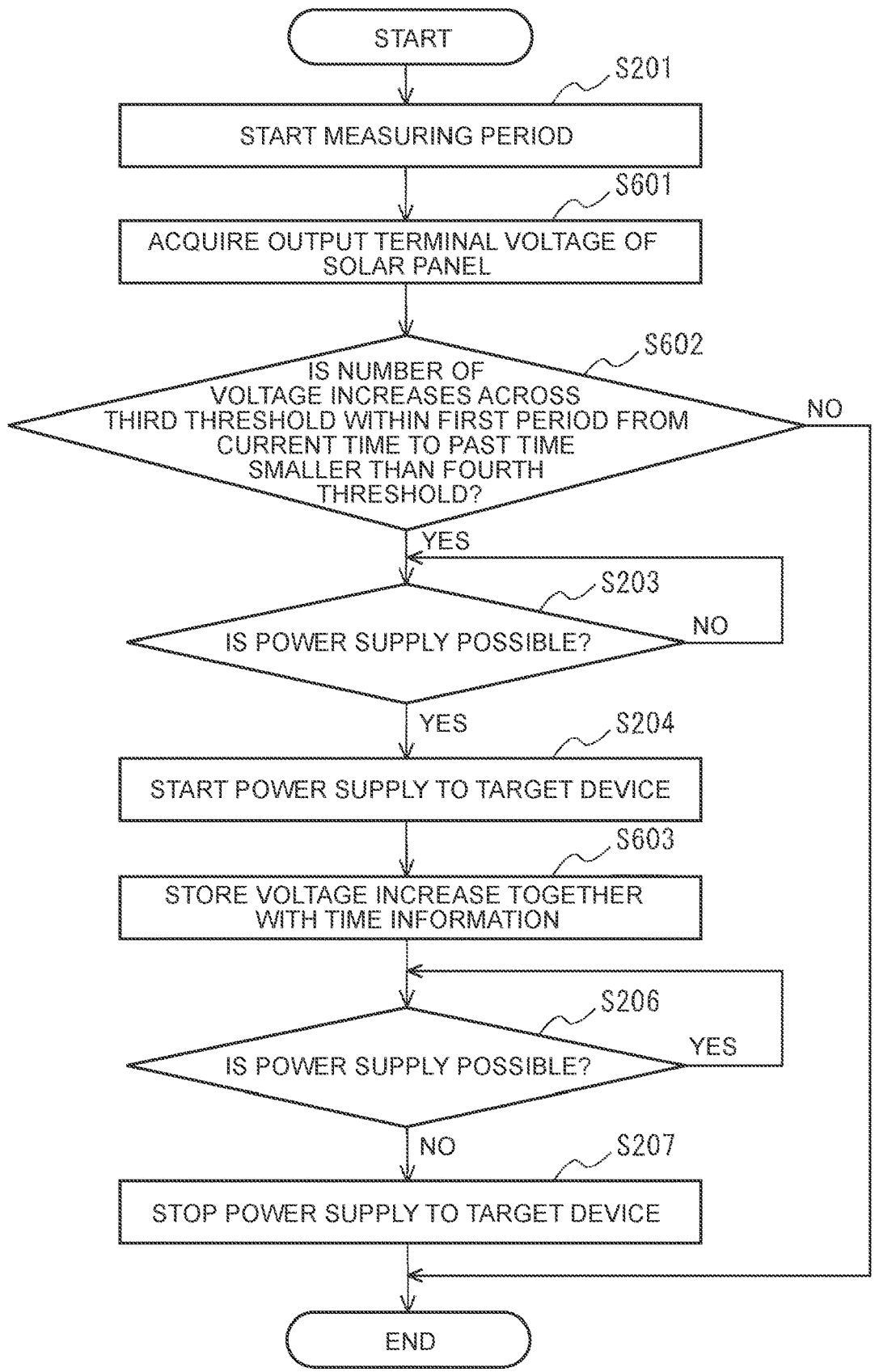
FIG. 6 is a flowchart for describing a processing procedure of a fifth example of the power supply control.

FIG. 6 is a flowchart for describing a processing procedure of a fifth example of the power supply control to be executed by the solar ECU 110 of the vehicle control device 100. In the power supply control in the fifth example, Step S202 of the power supply control in the first example (FIG. 2) is replaced with Step S601 and Step S602, and Step S205 is replaced with Step S603. Processes other than those of Step S601 to Step S603 in the fifth example are similar to the processes in the first example, and are therefore described while a part of the processes is omitted.

Step S201

The measuring unit/acquiring unit 140 starts measuring a period (time measurement). When the measurement of the period is started, the process proceeds to Step S601.

Step S601

The measuring unit/acquiring unit 140 acquires an output terminal voltage of the solar panel 10. When the output terminal voltage of the solar panel 10 is acquired, the process proceeds to Step S602.

Step S602

The determination unit 160 determines whether the number of voltage increases counted by the counting unit 150 satisfies the second condition. The number of voltage increases n3 in the fifth example is counted by the counting unit 150 within the first period Ta from the current time Tcur to the past time Tpast (Ta=Tcur−Tpast). The counted number is the number of pieces of information indicating that the output terminal voltage of the solar panel 10 has changed from a voltage lower than a third threshold N3 to a voltage equal to or higher than the third threshold N3. The second condition in the fifth example is that the number of voltage increases n3 is smaller than a fourth threshold N4 (n3<N4). The first period Ta, the third threshold N3, and the fourth threshold N4 are predetermined values determined in consideration of, for example, balance between a decrease in the performance of the photovoltaic power generating system and a reduction in the number of power supply operations. For example, the first period Ta and the fourth threshold N4 are appropriately set based on the properties of the solar panel 10, the durability of the devices such as the control device and the relay related to the power supply operation, and the loss of the performance of the photovoltaic power generating system. The third threshold N3 is a voltage for determining whether to execute the power supply from the solar panel 10 to the target device, and is set to a voltage at which the power supply from the solar panel 10 toward the target device is started. When determination is made that the number of voltage increases n3 satisfies the second condition because the number of voltage increases n3 is smaller than the fourth threshold N4 (S602: YES), the process proceeds to Step S203. When determination is made that the number of voltage increases n3 does not satisfy the second condition because the number of voltage increases n3 is equal to or larger than the fourth threshold N4 (S602: NO), the power supply control process is terminated.

Step S204

The power supply controller 170 executes the power supply from the solar panel 10 to the target device under control of the control ECU 130. When the power supply to the target device is executed, the process proceeds to Step S603.

Step S603

The counting unit 150 stores information indicating that the output terminal voltage of the solar panel 10 has changed from the voltage lower than the third threshold N3 to the voltage equal to or higher than the third threshold N3 in, for example, the predetermined storage together with information on a time measured by the measuring unit/acquiring unit 140 when the output terminal voltage changes across the third threshold N3. When the pieces of information related to the change in the output terminal voltage of the solar panel 10 and the time are stored, the process proceeds to Step S206.

In the power supply control in the fifth example, determination can indirectly be made as to whether the number of power supply operations from the solar panel 10 to the target device exceeds the reference based on the change in the output terminal voltage of the solar panel 10 instead of the number of power supply operations n1. This control can limit the number of power supply operations from the solar panel 10 to the power supply destination. Thus, it is possible to suppress early deterioration of the devices such as the control device and the relay related to the power supply operation.

The processes of Step S601 to Step S603 described in the power supply control in the fifth example are also applicable to the power supply control in each of the second example to the fourth example similarly to the power supply control in the first example when the number of power supply operations is replaced with the number of voltage increases.

Actions and Effects

As described above, the vehicle control device 100 according to the embodiment of the present disclosure executes the control as to whether to execute the power supply from the solar panel 10 to the target device by counting the number of operations of supplying electric power from the solar panel 10 to the target device that is the power supply destination (drive battery 20 or auxiliary device system 30) and determining whether the counted number of power supply operations satisfies the predetermined condition (first condition or second condition).

In this control, when the number of executed power supply operations from the solar panel 10 to the target device does not satisfy the predetermined condition, it is possible not to execute the power supply from the solar panel 10 to the target device newly. Therefore, it is possible to limit the number of power supply operations from the solar panel 10 to the target device, thereby suppressing early deterioration of the devices such as the control device and the relay related to the power supply operation.

Through the vehicle control device 100, the power supply from the solar panel 10 to the target device is not executed when the power supply from the solar panel 10 to the target device is not possible even in a case where the number of executed power supply operations from the solar panel 10 to the target device satisfies the predetermined condition. The vehicle control device 100 stops the power supply from the solar panel 10 to the target device when the power supply from the solar panel 10 to the target device becomes impossible after the start of the power supply. Thus, the power supply from the solar panel 10 to the target device can be executed efficiently.

The number of power supply operations may be the number counted within the arbitrary period that is the predetermined period Ta from the current time Tcur to the past time Tpast, or may be a cumulative number counted thus far. In the case of the cumulative number, the number may be reset at a timing when the date has changed. The number of power supply operations may be counted based on whether the voltage at the output terminal of the solar panel 10 fluctuates. By appropriately setting the number of power supply operations together with the predetermined condition, it is possible to suitably limit the number of power supply operations from the solar panel 10 to the target device.

Although the embodiment of the present disclosure is described above, the present disclosure can be regarded as the vehicle control device, a vehicle control method to be executed by the vehicle control device including the processor and the memory, a control program for executing the vehicle control method, a non-transitory computer-readable storage medium storing the control program, or a vehicle including the vehicle control device.

The vehicle control device of the present disclosure is applicable to, for example, a vehicle including a solar panel configured to execute photovoltaic power generation.

What is claimed is:

1. A vehicle control device configured to control supply of electric power generated by a solar panel mounted on a vehicle, the vehicle control device comprising:
   a counting unit configured to count the number of power supply operations in which the electric power is supplied from the solar panel to a target device that is a power supply destination;
   a determination unit configured to determine whether the number of power supply operations counted by the counting unit satisfies a first condition; and
   a power supply controller configured to execute power supply from the solar panel to the target device when the determination unit determines that the number of power supply operations satisfies the first condition, wherein
   the power supply controller is configured not to execute the power supply from the solar panel to the target device when the determination unit determines that the number of power supply operations does not satisfy the first condition.

2. The vehicle control device according to claim 1, wherein:
   the determination unit is configured to determine whether the power supply from the solar panel to the target device is possible; and
   the power supply controller is configured to execute the power supply from the solar panel to the target device when the determination unit determines that the number of power supply operations satisfies the first condition and the power supply from the solar panel to the target device is possible.

3. The vehicle control device according to claim 2, wherein the power supply controller is configured to stop the power supply from the solar panel to the target device when the determination unit determines that the power supply from the solar panel to the target device is not possible after a start of the power supply.

4. The vehicle control device according to claim 1, further comprising a measuring unit configured to measure time, wherein the determination unit is configured to determine, as the first condition, whether the number of power supply operations counted by the counting unit within a first period from a current time to a past time is smaller than a first threshold.

5. The vehicle control device according to claim 1, further comprising an acquiring unit configured to acquire date-and-time information, wherein:
   the counting unit is configured to reset the counted number when a time of the date-and-time information acquired by the acquiring unit is a first time; and
   the determination unit is configured to determine, as the first condition, whether the number of power supply operations counted by the counting unit is smaller than a second threshold.

6. The vehicle control device according to claim 5, wherein the first time is the same time on individual days.

7. A vehicle comprising:
a solar panel; and
a vehicle control device configured to
control supply of electric power generated by the solar panel,
count the number of power supply operations in which the electric power is supplied from the solar panel to a target device that is a power supply destination,
determine whether the number of power supply operations satisfies a first condition, and
execute power supply from the solar panel to the target device when determination is made that the number of power supply operations satisfies the first condition, wherein
the vehicle control device is configured not to execute the power supply from the solar panel to the target device when determination is made that the number of power supply operations does not satisfy the first condition.

8. A vehicle control method to be executed by a computer of a vehicle control device configured to control supply of electric power generated by a solar panel mounted on a vehicle, the vehicle control method comprising:
a step of counting the number of power supply operations in which the electric power is supplied from the solar panel to a target device that is a power supply destination;
a step of determining whether the number of power supply operations counted in the counting step satisfies a first condition;
a step of executing power supply from the solar panel to the target device when, in the determining step, determination is made that the number of power supply operations satisfies the first condition; and
a step of not executing the power supply from the solar panel to the target device when, in the determining step, determination is made that the number of power supply operations does not satisfy the first condition.

9. A non-transitory storage medium storing instructions that are executable by one or more processors of a computer of a vehicle control device configured to control supply of electric power generated by a solar panel mounted on a vehicle and that cause the one or more processors to perform steps comprising:
a step of counting the number of power supply operations in which the electric power is supplied from the solar panel to a target device that is a power supply destination;
a step of determining whether the number of power supply operations counted in the counting step satisfies a first condition;
a step of executing power supply from the solar panel to the target device when, in the determining step, determination is made that the number of power supply operations satisfies the first condition; and
a step of not executing the power supply from the solar panel to the target device when, in the determining step, determination is made that the number of power supply operations does not satisfy the first condition.

* * * * *